United States Patent [19]

Solomon

[11] 3,999,237
[45] Dec. 28, 1976

[54] BEE HIVE

[76] Inventor: Guillermo Solomon, Apartado 13068, Madrid, Spain

[22] Filed: Sept. 17, 1975

[21] Appl. No.: 614,141

[52] U.S. Cl. ............................................ 6/1; 6/4 R
[51] Int. Cl.[2] ....................................... A01K 47/00
[58] Field of Search ................................... 6/1, 4 R

[56] References Cited
UNITED STATES PATENTS

| 384,627 | 6/1888 | Howe | 6/1 |
| 464,360 | 12/1891 | Hawthorne | 6/4 R |

Primary Examiner—Robert Peshock
Assistant Examiner—Jack Q. Lever
Attorney, Agent, or Firm—John J. Hart

[57] ABSTRACT

The hive comprises a central tower of any height or capacity on which are mounted as many supers or brood boxes as needed. The supers or boxes are so mounted on the tower that each one is removable separately without the need to shift or disturb adjacent boxes. The control tower is constructed to provide a bee passageway system that affords ready access directly to each super or box and includes means whereby such passageway system may be modified to produce different conditions in the different boxes or to change the number of boxes that are in communication with the system without affecting the latters functions.

14 Claims, 6 Drawing Figures

BEE HIVE

This invention relates to beehives and has for its primary purpose the provision of an improved form of beehive that can readily be adapted to the varying conditions incurring in the manipulation of bees over successive periods and in such periods will ensure the production of healthy, strong bees with a minimum of labor.

The keeping of bees is an occupation that is subject to many variables including the actual knowledge of the beekeeper and the particular results he is seeking such as the amounts and types of honey desired, the development of a strong colony, the raising of queens, the use of bees for pollination, the raising of bees for sale, etc. Further, different types of bees may need at different times, different ways of handling. These results are also subject to variations in climate for Winter, Summer, Autumn and Spring require the employment of different techniques. Further, environment, such as the type of flora available near a hive, can also effect the results desired. These various factors are controlled by the types of hives employed and the mechanical manipulations a beekeeper exercises in the use of a particular hive construction.

A common method of cultivating bees is to stack a number of hive boxes or supers in vertical or side-by-side relation with free communication between the boxes. Such a method of arranging the hive boxes however, presents certain disadvantages which renders its practice unsatisfactory. Thus, one great disadvantage of stacking beehives either in vertical or side-by-side relation is that when the beekeeper needs to inspect, change, clean or medicate a given box or super in one of these prior beehives, it is almost always necessary to disturb or lift adjacent boxes with consequent chilling of the disturbed box or boxes and harmful consequences to the actual life of the insects involved.

In accordance with this invention there is provided an improved form of beehive which will enable a beekeeper to make all the mechanical manipulations which may be necessary in handling the bees under the varying conditions encountered, quickly and with a minimum of effort and without any damage to the bees. These advantages are attained because of the relative simplicity of construction of the improved beehive and the fact that with such construction the boxes can be handled as separate, independent units without disturbing the proper functioning of the remainder of the hive or the hive life in the hive or the separated boxes.

Figure 1:
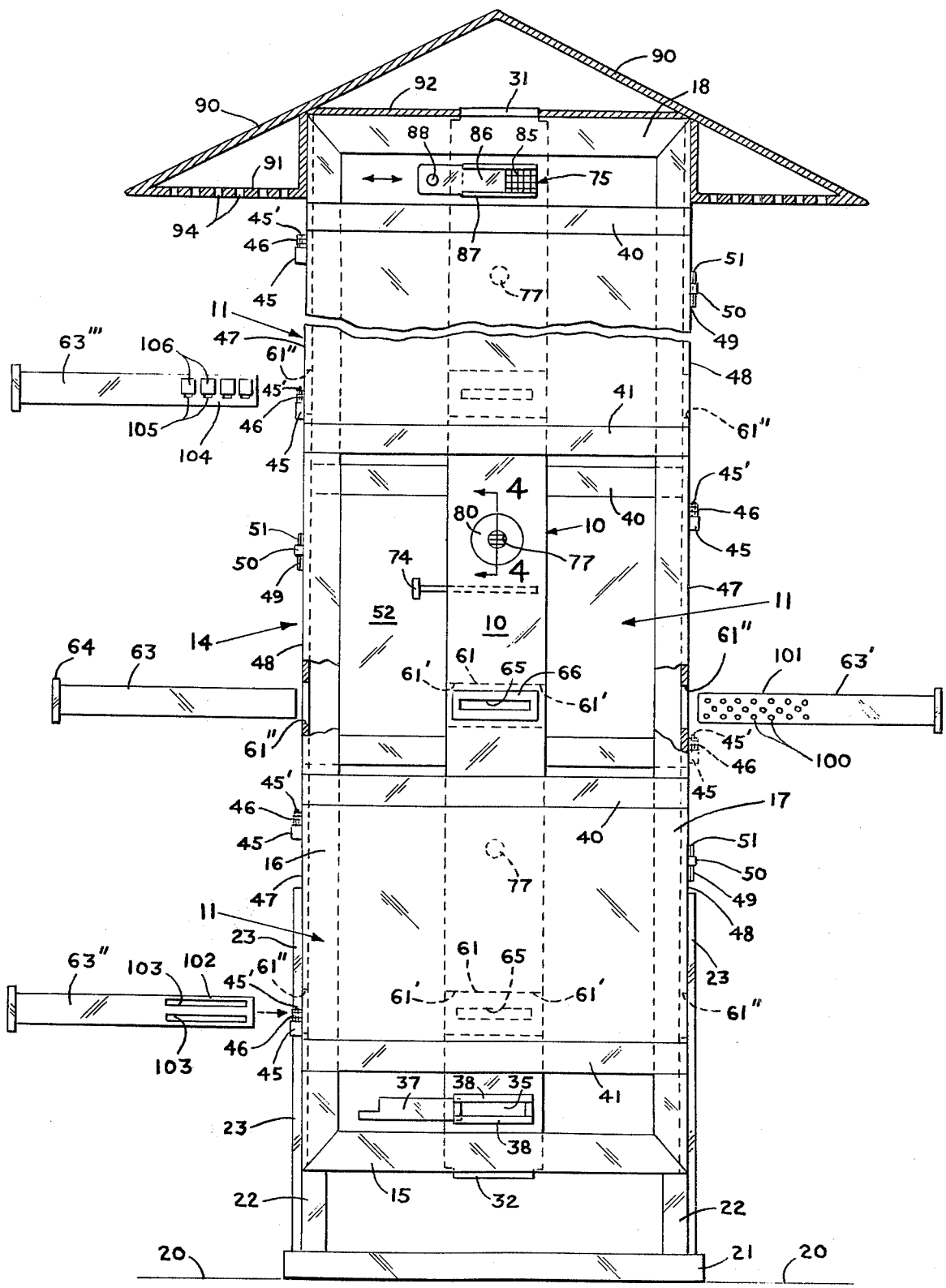
FIG. 1 is a front elevational view of a beehive embodying the invention; the view showing the frame supporting the hive boxes or supers with the central front box omitted to show more clearly the construction of the central portion of the beehive through which the bees communicate with the hive boxes or supers.
Figure 2:
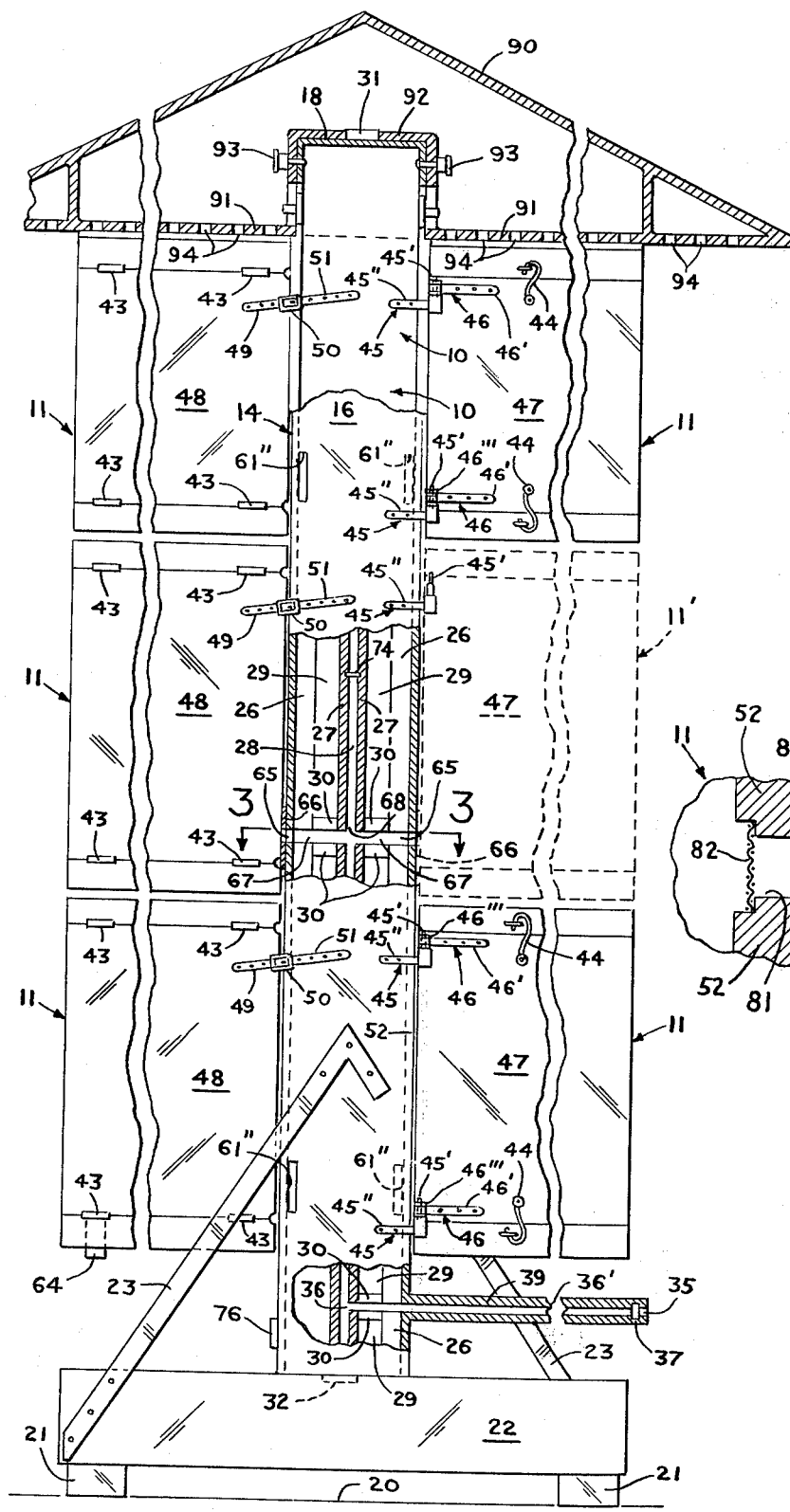
FIG. 2 is a partial side elevational view as seen from the left of FIG. 1; the central portion of the beehive being partially broken away to show its construction and the omitted front central box shown in dotted outline.

As is shown in FIGS. 1 and 2 of the drawings, the beehive of this invention is in the nature of an upright tower which in the preferred form of the invention, is composed of a vertical passagecase 10 centrally located in a rectangular frame 14 on which are supported a plurality of supers or hive boxes 11 containing the combs or foundations used by bees. The tower may be constructed to accommodate any number of such supers and boxes 11 more than two and for the purposes of illustration is shown constructed to support six boxes. As has been indicated, in order to show more clearly the construction of the central passagecase 10 the central front box 11' has been omitted and the omitted box 11' is indicated in dotted outline in FIG. 2 of the drawings. The boxes 11 may contain combs and foundation frames of any suitable type known to the art.

The rectangular frame 14 is composed of a bottom horizontal member 15, two vertical side members 16, 17 and a top horizontal member 18. The frame 14 has a vertical dimension of approximately four feet and a horizontal dimension of approximately twenty inches. The frame members are channel-shaped with their longitudinal recesses in opposed relation and are of a width approximating four inches. The frame 14 is supported in upright position on the ground 20 by two parallelly arranged base beams 21, 21 on which are mounted two transversely extending base beams 22, 22 providing a seat for the frame. The frame 14 is secured to the base beams 22, 22 in any suitable manner such as by the stay members 23, 23 shown in the drawings; the members 23 being secured in any suitable manner to the side members 16, 17 of the frame. The frame 14 may be constructed of any suitable material, but it is preferred that it be constructed as an integral metal frame that may readily be transported as a unit to different locations. Located between the flanges of the top and bottom frame beams 18 and 15, respectively, and secured thereto in any suitable fashion, are the top and bottom ends, respectively, of the passagecase 10.

Figure 3:
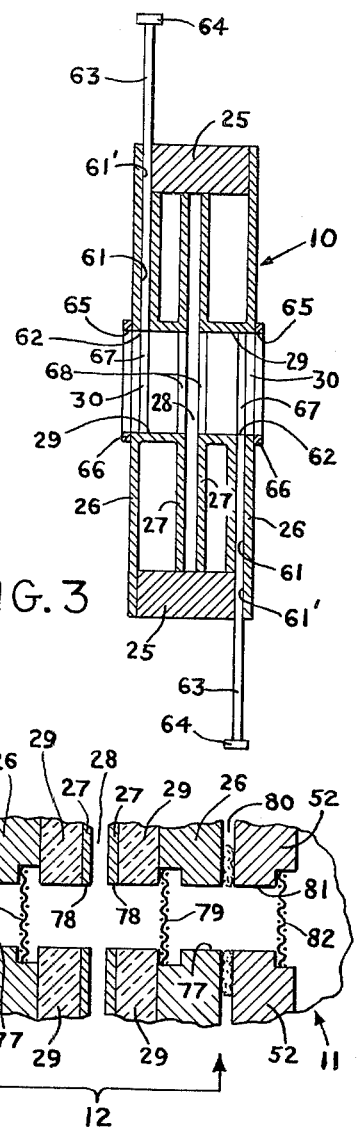
FIG. 3 is an enlarged sectional view of the central portion of the beehive taken along the line 3—3 in FIG. 2.
Figure 4:
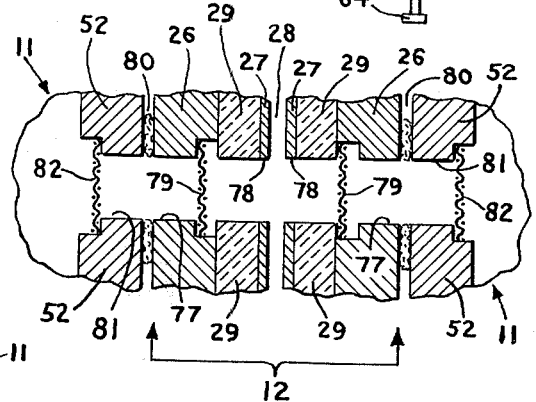
FIG. 4 is a partial sectional view on an enlarged scale of the central portion of the beehive taken through the line 4—4 of FIG. 1.

The passagecase 10 of the beehive tower is preferably constructed of wood or other suitable material and has cross-sectional dimensions dependent on the thicknesses and lengths of the materials used in its construction. Thus, for example, the thickness of the passagecase, as indicated by the bracket designated 12 in FIG. 4 of the drawings, may range from two to four inches. As is shown in FIGS. 2–4 of the drawings, the passagecase 10 comprises side beams 25, 25 which may be constituted of lengths of about 2¼ inches lumber and plywood front and back walls 26, 26. Extending between the side beams 25, 25 are two vertical lengths 27, 27 of elongated plywood boards defining a vertical main passageway 28 for the bees and or air. The plywood walls 27 are secured in proper position within the tower passagecase by vertical slats 29 and horizontal slats 30. The upper and lower ends of the tower passagecase 10 except for the passageway 28 are closed by the end slats 30. The side beams 25, plywood walls 26 and 27, and the slats 29 and 30 are secured together in any suitable fashion as by means of glue. The upper end of the main passageway 28 is closed by a cover 31 and the lower end of such passageway is closed by a closure 32. The cover 31 and closure 32 may be removably connected to the tower 10 to enable cleaning the passageway 28. As will be observed, the width of the bee passageway 28 is relatively small, about 5/16 of an inch, to just allow the bees walking space while preventing them from building undesirable combs within this passageway. The bees obtain entry into the passageway 28 through a main entry-exit opening 35 which may be located at any desirable place on the passagecase, such as for example, at the lower end of the tower 10 adjacent to the lower frame member 15, as shown, or at the top of the passagecase, or in one of the spaces between hive boxes mounted on the tower. Movement of the bees through the opening 35 to the passageway 28 is directed and confined by the slats 29, 30 being arranged to define a passageway 36 in FIG. 2 through the tower and by boards 39 forming an extension 36' of such passageway to a point approximate with the outer walls of the boxes 11. Instead of forming a straight extension passageway 36', as illustrated, the boards 39 may be arranged to form an angular extension passageway enabling the bees to enter and exit from a side of the tower instead of the front thereof as shown. The passageway 36 and its extension 36' are of restricted height, approximately one-half inch or less, to prevent the formation of combs therein. The opening or main bee portal 35 is adjustable and may be partially or wholly closed by a manually adjustable gate 37 slidably movable in the guide slots 38 provided in the boards 39 at the entrance 35. The bees, as well as air, travel from the passageway 36 up the main tower passageway 28 to minor openings 68 provided in the tower 10 to enable the bees to enter the hive boxes 11 supported by the frame 14. The bees and air also travel from the hive boxes 11 through such openings 68 to and through the tower passageway 28 and the passageway 36 and extension 36' thereof to the entry-exit opening 35. It will be understood that there is a minor opening 68 in the main passageway 28 for each hive box capable of being supported on the tower. The height of the main passageway 28 and consequently the number of operative minor openings 68 may be controlled by the use of one or more slidable gates 74 as is shown in FIGS. 1 and 2 of the drawings. These gates may be of the type of the gates 63 hereinafter described to entirely block the main passageway, to permit selective travel or types of bees therethrough, or to prevent the passage of bees, while permitting the passage of air therethrough.

The hive boxes mounted on the tower may be the usual rectangularly-shaped boxes that are customarily employed in bee hives. It is preferred however, that the boxes 11 constructed for use with the tower of this invention be made of wood, say ⅞ inch lumber. The boxes may be made of any suitable dimensions, say about twenty inches long, about 16 inches wide and about 10 inches high. The side walls of the box may be made of ⅞ inch lumber while the top and bottom walls 40 and 41, respectively may be made 1 inch thick. Preferably, the top and bottom walls 40 and 41, respectively, are both removably connected to one side wall 42 of the box by hinges 43 of the type known as "slip hinges" and which enable such walls 40 and 41 to be readily disassembled from the body of a box 11 for removal and replacement of the comb frames and for cleaning the inside of the box. The walls 40 and 41 are latched in their closed positions to the other side wall of the box by any suitable latching means 44 such as a hook and eye. The boxes 11 are each removably connected at one end to the side members 16, 17 of the tower frame 14. As is shown in FIGS. 1 and 2, the side frame member 16 is provided with three pairs of hinge straps 45 which are pivotally connected to hinge straps 46 secured to the end and back walls 47, 52, respectively, of the front stack of brood boxes 11. Similarly, the side frame member 17 is provided with three pairs of hinge straps 45 that are pivotally connected to hinge straps 46 provided on the same end walls 47, 52, respectively, of the rear stack of brood boxes 11. As will be observed from a comparison of FIGS. 1, 2 and 5 of the drawings, the hinge straps 46 are each composed of two strap members 46' and 46" disposed at right angles to each other and secured to the box walls 47 and 52, respectively. The end of strap member 46' connected to strap member 46" has provided thereon two parallel ears 46''' provided with registered openings to receive a vertical pin 45' secured to the strap portion 45" of the hinge strap 45. As will be observed from the hinge strap 45 shown in FIG. 2 in the area of the omitted box 11' the upper portions of the pins 45' are reduced in diameter to facilitate insertion of such pins in the registered openings provided in the ears 46''' of the straps 46. Furthermore, the reduced upper portions of the pins 45' of the upper hinge straps 45, such as the one referred to in FIG. 2, are of substantially shorter length than the reduced upper portions of the pins 45' of the lower hinge straps 45 to facilitate the installation and removal of a box 11 without disturbing the box adjacently above it (compare the pins 45' of the hinge straps 45 supporting the box 11 below the omitted box 11' in FIG. 2 and of the hinge straps 45 shown in FIG. 1 of the drawings).

As has been indicated, the brood boxes have a width approximately equal to the width of the frame 14, and on their opposite end walls 48, are provided with straps 49 carrying buckles 50 which interlock with catches provided on the ends of straps 51 secured to the side frame members 16 and 17. The three straps 51 for the front stack of brood boxes 11 are mounted on the side frame member 17 and the three straps 51 for the rear stack of brood boxes 11 are provided on the side frame member 16. It will thus be understood that the brood boxes 11 are removably hingedly mounted on the side frame members 16 and 17 and are normally secured against the side flanges of such frame members with the back walls 52 of the two stacks of boxes in opposed relation, by the fastening means 49–51. When it is desired to open the top lid 40 of a box for comb inspection, or to remove and replace the combs of a box, or to clean the latter, the fastening means 49–51 are disconnected and the box swung away from the tower 10 about its hinged connections 45, 46 to the side frame member 16 or 17. If it is desired to remove the box from the hive for any reason this can readily be accomplished by lifting the box slightly to uncouple the ears 46''' of the slip hinge straps 46 from the pins 45' of the slip hinge straps 45.

Figure 5:
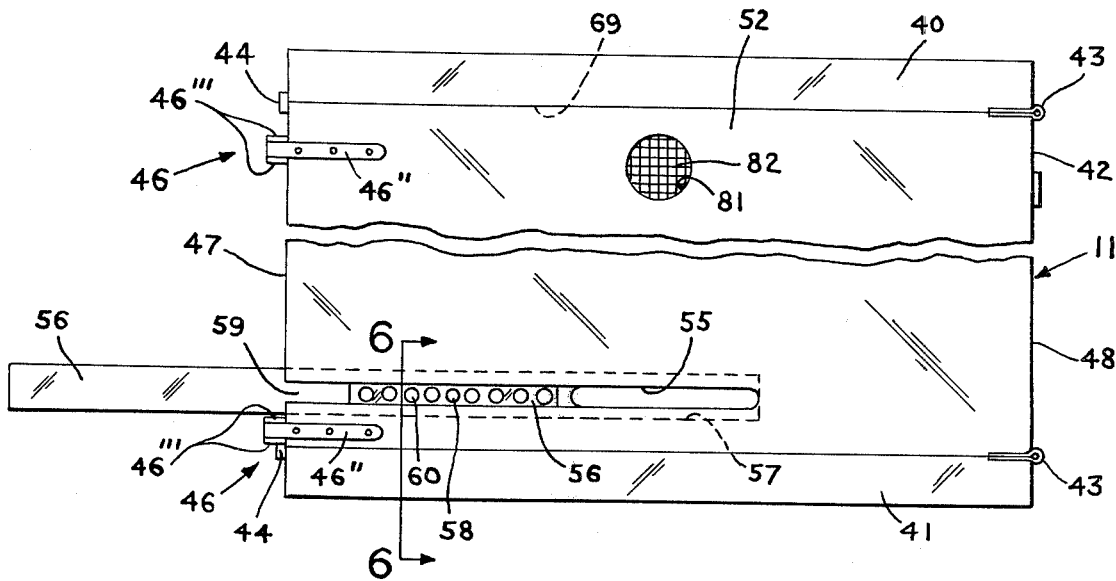
FIG. 5 is a partial rear elevational view of one of the hive boxes or supers in which are contained the combs for the bees.
Figure 6:
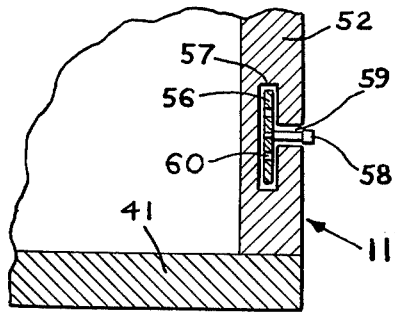
FIG. 6 is an enlarged partial vertical sectional view taken along the line 6—6 in FIG. 5.

As shown more clearly in FIGS. 5 and 6 of the drawings, the back or rear walls 52 of the boxes are provided with horizontal elongated bee entry and exit slots 55 located adjacent to the lower lids 41 of the boxes and substantially centrally of the back walls 52 thereof. The size of the opening of each slot 55 may be adjusted or closed by an adjustable hand operated closure or gate 56 slidably mounted in a groove 57 provided in the box rear wall 52 and having a central horizontal opening 59 in which a gate knob or finger 58 travels. The groove 57 extends from the end of the wall 52 attached to the box side wall 47 inwardly past one end of the slot 55 and to the other end of such slot. Normally the gate 56 is in open position as shown in FIG. 5 when the box is mounted on the tower to permit free entry and exit of the bees into and out of the box, respectively, through the slot 55 which at that time is normally in communication with the tower passageway 28. When a box 11 is pivoted away from or separated from the tower, the gate 56 is closed to seal the same. The gate 56 is provided with perforations 60 to afford ventilation into the brood box when the gate is closed. As in the case of the gates 74, the box gates 56 may be formed to permit selective travel or types of bees through the opening 35.

When the boxes 11 are in closed position on the frame 14 so as to be in operative relation with the tower 10, the openings 55 in the back walls 52 of such boxes are in register with similarly shaped openings 65 in the front and back walls 26 of such tower. Secured on the tower walls 26 so as to enclose the openings 65 therein are washers 66 of suitable resilient material to close the very small spaces between the tower walls 26 and the box rear walls 52 and thereby prevent the passage of air through and the deposit of propolis (bee glue) by the bees into such spaces. As will be observed from a comparison of FIGS. 2 and 3, the slats 29 and 30 and the inner ends 62 of control keys or gates 63 are arranged to provide an approximately ½ inch high passageway 67 between the openings 65 and corresponding openings 68 formed in the side walls 27 of the passageway 28. It will thus be seen that free access to and from each of the brood boxes 11 and the main hall or tower passageway 28 is afforded the bees. The keys or gates 63 are slidably mounted on the transverse slats 30 defining the top and bottom surfaces of the passageways 67. These transverse slats 30, the front and back walls 26 of the tower and the walls 27 forming the central tower passageway 28 form for each key 63 a transverse guideway 61 that extends outwardly from the portion of slat 29 forming one side of the passageway 67 and through openings 61' provided in the side beams 25 of the tower 10. The side members 16 and 17 of the frame 14 are provided with openings 61'', in FIGS. 1 and 2, aligned with the side beam openings 61' and cooperating with the transverse guideway 61 to guide manual adjustment of the keys 63 exteriorly of the frame 14. The passageway 61, opening 61'' and keys or pins 63 have substantially similar rectangular cross-sectional configurations and widths approximating the space between the plywood walls 27 forming the passageway 28 and the front and back walls 26 of the tower.

It will be understood from the foregoing, that by grasping the handle 64 of a key or gate member 63, which handle is located exteriorly of the frame 14, and pushing on it to move the key inwardly relative to the associated aligned opening 61'' in the frame member 16 or 17 and passageway 61 which guide such keys in its sliding movements, the inner end portion of such key 63 will move across the associated opening 65 in the front or back wall 26 of the tower and the associated opening 68 in a plywood wall 27 of such tower toward the portion of the slat 29 forming one side of the passageway 67 between such openings 65 and 68. The keys or gates 63 are multiformed to accomplish a variety of purposes. Thus as illustrated in FIG. 1 of the drawings, if the key or gate 63 has a solid inner end portion, the actuation of the same will either open or close an opening 68 in the central tower passageway 28. By providing small openings 100 as in the inner portion 101 of the key 63', the key although blocking the opening 68 will permit ventilation therethrough while preventing the passage of bees through such opening. The inner end portion of a key, as the key 63'', can be formed to exclude queen bees while permitting the passage of workers. This can be accomplished by forming the inner end portion 102 of the key 63'' with two longitudinal slots 103 of such width that the bees, but not the queen, can pass through such end portion when the key 63'' is moved to closed position. The inner end portion of a key can be formed also to permit one way travel only of the bees; as in the case of the key 63'''. To accomplish this result, the inner end portion 104 thereof is provided with an aligned series of openings 105 large enough to permit the passage of bees therethrough. The openings 105 are normally closed by depending yieldable gate members 106 hingedly connected at their upper ends to the key portion 104 and having an area larger than the areas of the openings 105 that they cover. The gate members 106 are arranged on the pin portion 104 so that the bees can push them open and escape through the openings 105 from a box 11 into the central tower passageway 28, but do not permit the bees to pass from the tower into the box. In this way a box 11 can be freed of bees to permit free access to the honey therein.

It will of course, be understood, that only one key or gate 63 is located at a time in association with a tower opening 68 and that its configuration will be dependent on whether the passage between the tower passageway 28 and the associated box 11 is to be closed to permit detachment of the box from the tower, or to accomplish a particular purpose that the beekeeper has in mind. When the box is to be detached from the tower, it is preferred to employ either a key 63 having a solid inner end portion, or a key 63' having an inner end portion perforated to permit ventilation, but preventing the passage of bees. After such a key or gate has been closed by hand to close the appropriate opening 68 to the passageway 28, and the gate 56 for the opening 55 is also closed by hand to isolate the box 11 from the hive tower, the box 11 can either be swung out for inspection, or removed from the hive in the manner previously explained.

To control the ventilation of the air currents flowing through the tower passage 28 and its entrances and exits and through the brood boxes 11 there are provided at the upper and lower ends of the tower 10 ventilation openings 75 and 76, respectively, and intermediate such tower ends ventilation openings 77 communicating with the boxes 11. As to the openings 77, it will be observed from a comparison of FIGS. 1, 4 and 5, that there is formed through both of the side walls 27 of the central tower passage 28 at the upper portions of the two boxes 11 on each level of the tower the registered openings 78, 78 which are preferably of circular form. The openings 78 are in registration with the ventilation openings 77 which are formed through the front and back tower walls 26 and are similar in configuration to the openings 78. The inner sides of the tower walls 26 are recessed around the openings 77 to receive screens 79 preventing passage of bees therethrough. The screens 79 are locked in position in the recess by the adjacent ends of vertical slats 29 spaced apart so as not to interfere with the air flow through the openings 77 and 78. Secured to the outer surfaces of the tower walls 26 and enclosing the openings 77 are gaskets 80 of suitable resilient material to provide an air proof connection between the ventilation openings of the tower and those of the boxes. The rear walls 52 of each of the boxes 11 is provided with a ventilation opening 81 which when the box is properly positioned for connection with the main tower hall 28, is in registration with one of the tower ventilation openings 77. The opening 81 is of a configuration similar to that of opening 77 and is also closed by a screen 82 seated in a recess provided in the box wall 52.

The top ventilation opening 75 is located in the tower 10 between the top frame member 18 and the top lid 40 of the top front box 11 as is shown in FIG. 1 of the drawings. The top ventilation opening 75 is formed in the manner of the front ventilation opening 77 with a screen 85 to prevent insects from passing therethrough into the tower passageway 28. The top ventilation opening 75 differs in configuration from opening 35 in that it is rectangular-shaped and elongated in a horizontal direction in the manner of the bee entrance opening 35 but substantially wider than the latter. Like opening 35, opening 75 is provided with a gate 86, slidably movable in guides 87 when manually manipulated through the handle knob 88.

The lower ventilation opening 76 is located in the tower 10 between the bottom frame member 15 and the bottom lid 41 of the bottom rear box 11. The lower ventilation opening is formed in the manner of the back or rear ventilation opening 77 with a screen and an adjustable gate in the manner of the top ventilation opening 75.

Mounted on the upper end of the hive is a roof 90 configured to protect the boxes 11 from rain and sun without impairing outside ventilation and shade. The roof 90 has a lower wall 91 provided with a central portion 92 shaped to form a seat for the top end of the frame to which it may be securely detachably connected by spring pressed plungers 93 engageable with recesses in the flanges of the top frame member 18. The lower wall 91 may be sufficiently low to be below the top ventilation opening 75 so that the latter is protected against the elements. The lower wall 92 is provided with perforations 94 to permit air to flow through the opening 75.

It will be understood from the foregoing description of the beehive of this invention, that its principal feature resides in the central tower which affords a wild passage or communication between all the supers and brood boxes while enabling the latter to be utilized as separate, independent units that may be variably utilized to accomplish different results desired by the beekeeper and changed in position or kind, or eliminated, without disturbing adjacent boxes or supers. The construction of the tower provides for the suspension of the supers or boxes onto a metal frame so that they are readily accessible to a central passageway through which the bees travel to the boxes. The number of boxes mounted on the frame 14 may be readily varied and any one box can be readily inspected and serviced without disturbing the other boxes. The tower construction gives it a universaliness in that it is readily adaptable to the employment of supers and boxes of known constructions as well as the preferred form disclosed herein, and the means provided for mounting the supers and boxes thereon facilitates the change and inspection thereof without affecting hive functions.

The tower construction also readily enables the ready variation in the number of supers or boxes employed at any particular time, whether removed from the tower or remaining mounted thereon in inoperative condition; without affecting the functions of the tower. Means are provided on the tower to control readily and selectively for a wide range of conditions the use of the hive by the bees and its ventilation. The main bee entrance and the ventilation openings because of their locations and constructions are protected from the weather, other insects and small animals without running any risk of asphyxiation of the bees. The bees have unobstructed straight lanes for their passage into and out of the brood boxes and do not have to go through a number of boxes to reach the particular box in which they work. This enables the bees to perform their functions with a minimum of trouble and stress. The construction of the hive also enables the provision of varying methods of ventilation and other modifications that may be required in the conducting of experiments in the care, control and study of bees. Thus, at any given time conditions in the boxes, and the passages thereto may be readily changed and modified to suit all possible conditions that may be encountered or desired to be present during the usage of the hive.

What is claimed is:

1. A beehive comprising an elongated passagecase having a longitudinally extending main bee passageway provided with a main bee opening and a plurality of spaced minor bee openings, a plurality of hive boxes each having a bee opening in one wall thereof, means removably connecting said hive boxes in operative relation to said passagecase and in spaced independent relation to each other with said hive box openings in registry with minor openings of said main passageway, and means controlling communication through the registered minor and hive box openings.

2. A beehive as defined in claim 1, in which said hive box connecting means comprises means pivotally supporting each of said hive boxes relative to said passagecase for movement toward a closed position in which the bee opening thereof is in adjacent registered relation to an associated minor passageway opening, and for movement away from such closed position to an open position for servicing without disturbing the other hive boxes, said controlling means being operative to close said associated minor passageway opening to bee traffic in the opened position of said hive box.

3. A beehive as defined in claim 2, in which said hive box connecting means includes means for securing each hive box in its closed position.

4. A beehive as defined in claim 1, in which said hive boxes are arranged in aligned spaced relation alongside said passagecase, and in which said hive box connecting means is constructed and arranged to permit movement of each hive box relative to said passagecase and the removal of such hive box from the latter without disturbing the other hive boxes.

5. A beehive as defined in claim 1, in which said controlling means is selectively operable to prevent or control the passage of air and/or bees through anyone of said minor passageway openings without interference with the other minor passageway openings.

6. A beehive as defined in claim 5, in which said controlling means comprises gate members slidably mounted on said passagecase in association with said minor passageway openings and each manually operable to control its associated minor passageway opening, the opening controlling portion of each said gate member having a configuration capable of controlling a given air and/or bee passage condition through its associated minor passageway opening in the closed condition of such gate member.

7. A beehive as defined in claim 1, including means operable to control the extent of travel of the bees through said main passageway.

8. A beehive as defined in claim 1, in which said main passagecase is provided with ventilation openings communicating the atmosphere with said main passageway and the minor passageway openings, and thereby with the interiors of hive boxes having bee openings in registry with the minor passageway openings, said passagecase including means for blocking the passage of bees through said ventilation openings.

9. A beehive as defined in claim 1, including means defining an extension passageway disposed transversely to said main passageway and in communication at one end with said main passageway bee opening, said extension passageway extending outwardly from said main passageway to a position spaced therefrom a distance approximating the dimension of a hive box in the same direction, and gate means at the outer end of said passageway extension controlling the passage of bees and/or air therethrough.

10. A beehive as defined in claim 1, including a base in which said passagecase is vertically disposed, and in which said hive box connecting means comprises an upright frame mounted on said base, and means supporting said boxes on said frame above the ground in vertically aligned stacked relation.

11. A beehive as defined in claim 10, in which said frame is constructed to enclose said passagecase and is connected to the top and bottom ends of said vertical passagecase, said passagecase being spaced from the sides of said frame, and in which said beehive connecting means further comprises hive box supporting means removably supporting said hive boxes on the sides of said frame so that said hive boxes span the frame space between said frame sides and said one wall of each of said hive boxes is disposed in adjacent opposed relation to a portion of said passagecase.

12. A beehive as defined in claim 1, including a hive box composed of a body having said one wall, a pair of closures for the top and bottom of said box, and means movably connecting each of said closures to said body.

13. A beehive as defined in claim 12, in which said closure connecting means comprises means hingedly connecting one edge of each of said closures to said body and means detachably connecting the opposite edge of each of said closures to said body, the hinged means for one of said closures consisting of slip hinges removably connecting such closure to said body.

14. A beehive as defined in claim 12, in which said hive box comprises a slidable gate mounted on said one wall thereof to control the passage of air and/or bees through the bee opening in said one wall, said body being provided with a second opening and means permitting the passage of air through said second opening and blocking the passage of bees therethrough.

* * * * *